US012496001B2

(12) United States Patent
Jadhav et al.

(10) Patent No.: US 12,496,001 B2
(45) Date of Patent: Dec. 16, 2025

(54) HEMOLYSIS-REDUCTION ACCESSORIES FOR DIRECT BLOOD DRAW

(71) Applicant: CAREFUSION 303, INC., San Diego, CA (US)

(72) Inventors: Amarsinh Deeliprao Jadhav, Bangalore (IN); Mohammed Mehtab Khan, Whitefield Bangalore (IN); Rahul Malviya, British Columbia (CA)

(73) Assignee: CAREFUSION 303, INC., San Diego, CA (US)

( * ) Notice: Subject to any disclaimer, the term of this patent is extended or adjusted under 35 U.S.C. 154(b) by 495 days.

(21) Appl. No.: 18/071,033

(22) Filed: Nov. 29, 2022

(65) Prior Publication Data

US 2023/0200692 A1 Jun. 29, 2023

Related U.S. Application Data

(60) Provisional application No. 63/293,489, filed on Dec. 23, 2021.

(51) Int. Cl.
*A61B 5/15* (2006.01)

(52) U.S. Cl.
CPC .. *A61B 5/150206* (2013.01); *A61B 5/150992* (2013.01)

(58) Field of Classification Search
CPC ........ A61B 5/150206; A61B 5/150992; A61B 5/150732; A61B 5/150946; A61B 5/1535;
(Continued)

(56) References Cited

U.S. PATENT DOCUMENTS

| 7,892,213 B2* | 2/2011 | Walborn | ............... A61M 5/141 604/246 |
| 8,016,790 B2* | 9/2011 | Walborn | ........... A61M 5/16877 417/163 |

(Continued)

FOREIGN PATENT DOCUMENTS

| CA | 2909231 A1 * | 10/2014 | ........... A61B 5/1411 |
| CN | 112741628 A * | 5/2021 | ............ A61M 39/10 |

(Continued)

OTHER PUBLICATIONS

International Preliminary Report on Patentability from the International Preliminary Examining Authority for Application No. PCT/US2022/051560, dated Oct. 6, 2023, 16 pages.

(Continued)

*Primary Examiner* — Jeffrey G. Hoekstra
(74) *Attorney, Agent, or Firm* — MASCHOFF BRENNAN

(57) ABSTRACT

A flow restriction device may include a housing with first and second end portions forming respective first and second openings, and a cavity configured to receive an insert body defining a fluid passage that extends from a first opening of the housing at the first end portion to a second opening of the housing at the second end portion, where the fluid passage extends in more than one direction along a path between the first and second end portions of the housing to induce a resistance to a fluid flow moving through the device, thereby reducing a flow rate and pressure of the fluid, and where the fluid is blood, reduce the hemolysis index of the blood.

20 Claims, 12 Drawing Sheets

(58) Field of Classification Search
CPC .......... A61B 5/15003; A61B 5/150007; A61B 5/153; A61M 5/16804
See application file for complete search history.

(56) References Cited

U.S. PATENT DOCUMENTS

| | | |
|---|---|---|
| 2012/0277627 A1 | 11/2012 | Devgon |
| 2014/0188002 A1* | 7/2014 | Close ................ A61M 5/16804 600/581 |
| 2015/0011847 A1 | 1/2015 | Hayden |
| 2016/0015300 A1* | 1/2016 | Wang ............... A61B 5/150389 600/576 |
| 2019/0076074 A1 | 3/2019 | Bullington et al. |
| 2021/0128037 A1 | 5/2021 | Burkholz et al. |
| 2021/0228127 A1 | 7/2021 | Burkholz et al. |

FOREIGN PATENT DOCUMENTS

| | | | | |
|---|---|---|---|---|
| JP | 2014507220 A | * | 3/2014 | ............. A61B 5/154 |
| WO | WO-2013120665 A1 | * | 8/2013 | ....... A61B 5/150503 |

OTHER PUBLICATIONS

International Search Report and Written Opinion for Application No. PCT/US2022/051560, dated Mar. 24, 2023, 13 pages.
Extended European Search Report for Application No. 24212894.0, dated Mar. 19, 2025, 11 pages.
Japanese Office Action for Application No. 2024-536200, dated Jan. 9, 2025, 7 pages including translation.

* cited by examiner

HEMOLYSIS-REDUCTION ACCESSORIES FOR DIRECT BLOOD DRAW

CROSS-REFERENCE TO RELATED APPLICATIONS

This application claims the benefit of U.S. Provisional Application No. 63/293,489, titled "HEMOLYSIS-REDUCTION ACCESSORIES FOR DIRECT BLOOD DRAW," filed Dec. 23, 2021, the disclosure of which is incorporated herein by reference in its entirety.

TECHNICAL FIELD

The present disclosure generally relates to blood draw and administration of parenteral fluids to a patient, and particularly to systems and methods to reduce hemolysis in PIVC blood draw using a flow restriction device.

BACKGROUND

Catheters are commonly used for a variety of infusion therapies. For example, catheters may be used for infusing fluids, such as normal saline solution, various medicaments, and total parenteral nutrition, into a patient. Catheters may also be used for withdrawing blood from the patient.

A common type of catheter is an over-the-needle peripheral intravenous ("IV") catheter (PIVC). As its name implies, the over-the-needle catheter may be mounted over an introducer needle having a sharp distal tip. A catheter assembly may include a catheter hub, the catheter extending distally from the catheter hub, and the introducer needle extending through the catheter. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient.

In order to verify proper placement of the introducer needle and/or the catheter in the blood vessel, a clinician generally confirms that there is "flashback" of blood in a flashback chamber of the catheter assembly. Once placement of the needle has been confirmed, the clinician may temporarily occlude flow in the vasculature and remove the needle, leaving the catheter in place for future blood withdrawal or fluid infusion.

For blood withdrawal or collecting a blood sample from a patient, a blood collection container may be used. The blood collection container may include a syringe. Alternatively, the blood collection container may include a test tube with a rubber stopper at one end. In some instances, the test tube has had all or a portion of air removed from the test tube so pressure within the test tube is lower than ambient pressure. Such a blood collection container is often referred to as an internal vacuum or a vacuum tube. A commonly used blood collection container is a VACUTAINER® blood collection tube, available from Becton Dickinson & Company.

The blood collection container may be coupled to the catheter. When the blood collection container is coupled to the catheter, a pressure in the vein is higher than a pressure in the blood collection container, which pushes blood into the blood collection container, thus filling the blood collection container with blood. A vacuum within the blood collection container decreases as the blood collection container fills, until the pressure in the blood collection container equalizes with the pressure in the vein, and the flow of blood stops.

Unfortunately, as blood is drawn into the blood collection container, red blood cells are in a high shear stress state and susceptible to hemolysis due to a high initial pressure differential between the vein and the blood collection container. Hemolysis may result in rejection and discard of a blood sample. The high initial pressure differential can also result in catheter tip collapse, vein collapse, or other complications that prevent or restrict blood from filling the blood collection container. Furthermore, blood spillage during and/or after blood draw commonly occurs.

The description provided in the background section should not be assumed to be prior art merely because it is mentioned in or associated with the background section. The background section may include information that describes one or more aspects of the subject technology.

SUMMARY

The present disclosure provides a flow restriction device, comprising a housing comprising a first end portion, a second end portion, an inner surface forming a cavity between the first and second end portions, a first opening through the first end portion, and a second opening through the second end portions, and an insert body comprising a first end, a second end, a longitudinal axis extending through the first and second ends, and an inner surface forming a fluid passage extending between the first and second ends, the fluid passage comprising a first portion that extends in a first direction away from the longitudinal axis, a second portion that extends in a second direction toward the longitudinal axis, and a third portion that extends in the first direction, wherein the insert body is positioned within the cavity with a first opening of the fluid passage fluidly coupled with the first opening of the housing, and the second opening of the fluid passage fluidly coupled with the second opening of the housing.

In some instances, the present disclosure provides a flow restriction device, comprising a housing comprising a first end portion, a second end portion, an inner surface forming a cavity between the first and second end portions, a first opening through the first end portion, and a second opening through the second end portions, and an insert body comprising a first end, a second end, an outer surface extending between the first and second ends, and an inner surface forming a fluid passage extending between the first and second ends, the fluid passage having a first opening through the first end of the insert body, a second opening through the second end of the insert body, and a third opening through the outer surface, wherein the insert body is positioned within the cavity with the first opening of the fluid passage fluidly coupled with the first opening of the housing, the second opening of the fluid passage fluidly coupled with the second opening of the housing, and the third opening obstructed by the inner surface of the housing.

In some instances, the present disclosure provides a peripheral intravenous catheter assembly configured to limit hemolysis during the drawing of blood from a patient, comprising a flow restriction device, comprising, a housing comprising a first end portion a first end portion, a second end portion, an inner surface forming a cavity between the first and second end portions, a first opening through the first end portion, wherein the first end portion is configured to couple to a catheter assembly, and the second end portion is configured to couple to a fluid collection device, an insert body comprising a first end, a second end, a longitudinal axis extending through the first and second ends, and an inner surface forming a fluid passage extending between the first and second ends, the fluid passage comprising a first portion that extends in a first direction away from the longitudinal axis, a second portion that extends in a second direction toward the longitudinal axis, and a third portion that extends in the first direction, wherein the insert body is positioned within the cavity with a first opening of the fluid passage fluidly coupled with the first opening of the housing, and a second opening of the fluid passage fluidly coupled with the second opening of the housing to limit hemolysis of blood drawn from a patient from the first end portion of the housing into the fluid collection device via the second end portion of the housing, a catheter hub having a proximal end and a distal end, and a fluid connector that fluidly couples the catheter hub with the flow restriction device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
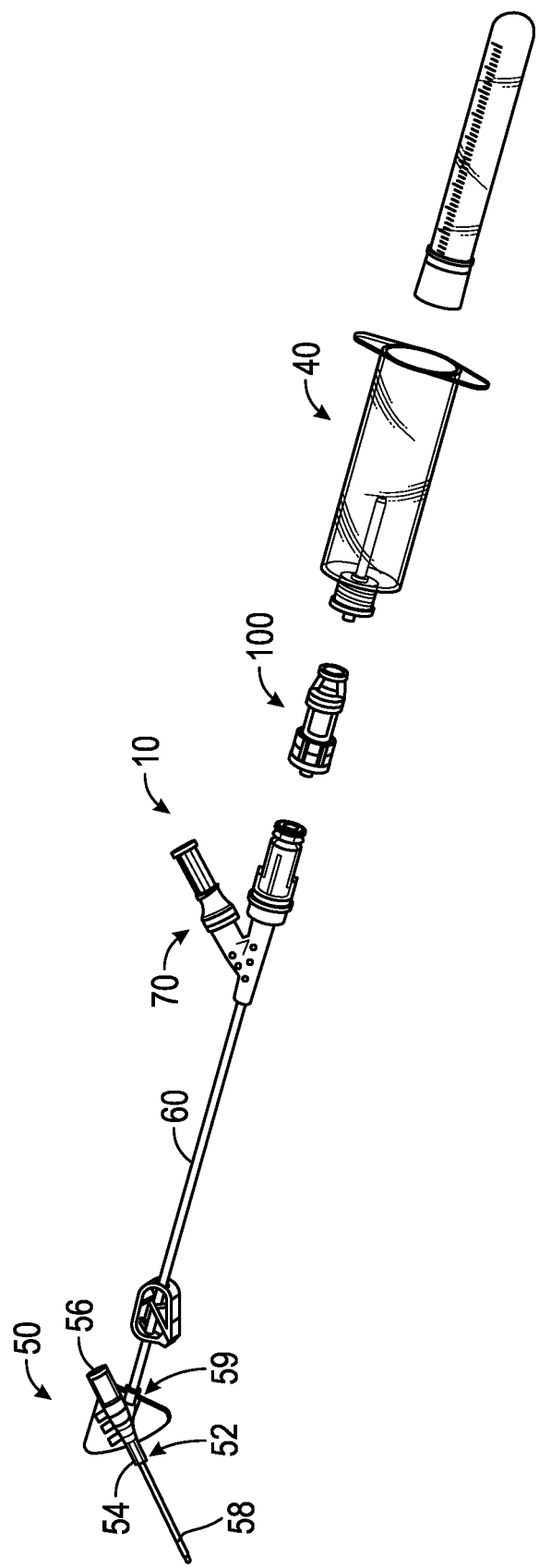
FIG. 1 illustrates a vascular access device including a peripheral intravenous catheter (PIVC) assembly that includes a flow restriction device, in accordance with some embodiments of the present disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Blood draw via a vascular access device has drawn increasing attention attributed to minimized needle sticks and improved operation efficiency as compared with traditional blood draw methods with venipuncture. Current blood draw using a peripheral intravenous catheter (PIVC) has seen some challenges, one of the most critical is hemolysis related blood quality. In particular, with currently existing PIVC products in the market, along with the standard connection (such as a short extension set and a needleless connector), and blood collection devices (such as a Vacutainer), the shear stress exerted onto blood cells tends to be on the verge of hemolyzing.

Various embodiments of the present disclosure are directed to providing systems and methods to address hemolysis in PIVC blood draw with a hemolysis reduction accessory (also referred to herein as a flow restriction device) which can be pre-attached to the PIVC and decrease a flow rate to reduce a risk of hemolysis. The hemolysis-reduction accessory is advantageously compatible with PIVC placement and does not necessitate change to any of the existing operations. The hemolysis-reduction accessory of the various embodiments described herein is potentially applicable to a wide variety of PIVC products, and compatible with existing blood collection devices and infusion disposables.

Various embodiments of the present disclosure focus on effective flow rate reduction with the add-on hemolysis-reduction accessory (also referred to herein as a flow restriction device) that regulates the overall flow rate of the entire fluid path as blood cells travel through. The flow restriction device can be either assembled with the PIVC or co-packaged with the PIVC. As such, there is no additional operation during catheter placement since the device can permit blood flashback. The clinician may connect a blood collection device to a port or opening of the accessory and can then draw blood to the intended volume. After blood draw, the clinician may disconnect and discard the flow restriction device and the blood collection device together. As such, this flow restriction device can be either for single blood draw or stay inline throughout indwell.

The flow restriction devices and associated blood collection systems of the various embodiments described herein additionally provide further advantages over currently existing blood collection systems. For example, add-on flow restriction devices described herein allow for hemolysis-reduction function to be integrated for PIVC blood draw. Further, the flow restriction devices described herein are compatible with PIVC placement and allow for seamless blood draw at insertion. Additionally, since the flow restriction devices are an add-on which can be easily incorporated without any changes to existing PIVC, there is minimal impact to clinical setting and operations.

FIG. 1 illustrates a vascular access device 10 including a peripheral intravenous catheter (PIVC) assembly 50 that includes a flow restriction device 100, in accordance with some embodiments of the present disclosure. The flow restriction device 100 may be configured to reduce a likelihood of hemolysis during blood collection using the vascular access device 10. In some embodiments, the vascular access device 10 may include a catheter assembly 50. The catheter assembly 50 may include a catheter hub 52, which may include a distal end 54, a proximal end 56, and a lumen extending through the distal end and the proximal end. The catheter assembly 50 may further include a catheter 58, which may be secured within the catheter hub 52 and may extend distally from the distal end 54 of the catheter hub 52. In some embodiments, the catheter assembly 50 may be a peripheral intravenous catheter (PIVC).

In some embodiments, the catheter assembly 50 may include or correspond to any suitable catheter assembly 50. In some embodiments, the catheter assembly 50 may be integrated and include an extension tube 60, which may extend from and be integrated with a side port 59 of the catheter hub 52. A non-limiting example of an integrated catheter assembly is the BD NEXIVA™ Closed IV Catheter system, available from Becton Dickinson and Company. In some embodiments, a proximal end of the extension tube 60 may be coupled to an adapter, such as, for example, a Y-adapter 70. In some embodiments, the flow restriction device 100 may be fluidly coupled to the Y-adapter 70.

In some embodiments, the catheter assembly 50 may be non-integrated and may not include the extension tube 60. In these and other embodiments, the flow restriction device 100 may be configured to couple to the proximal end 56 of the catheter hub 52 or another suitable portion of the catheter assembly 50. In some embodiments, the flow restriction device 100 may be coupled directly to the catheter assembly 50, eliminating the extension tube 60 and providing a compact catheter system.

Figure 2:
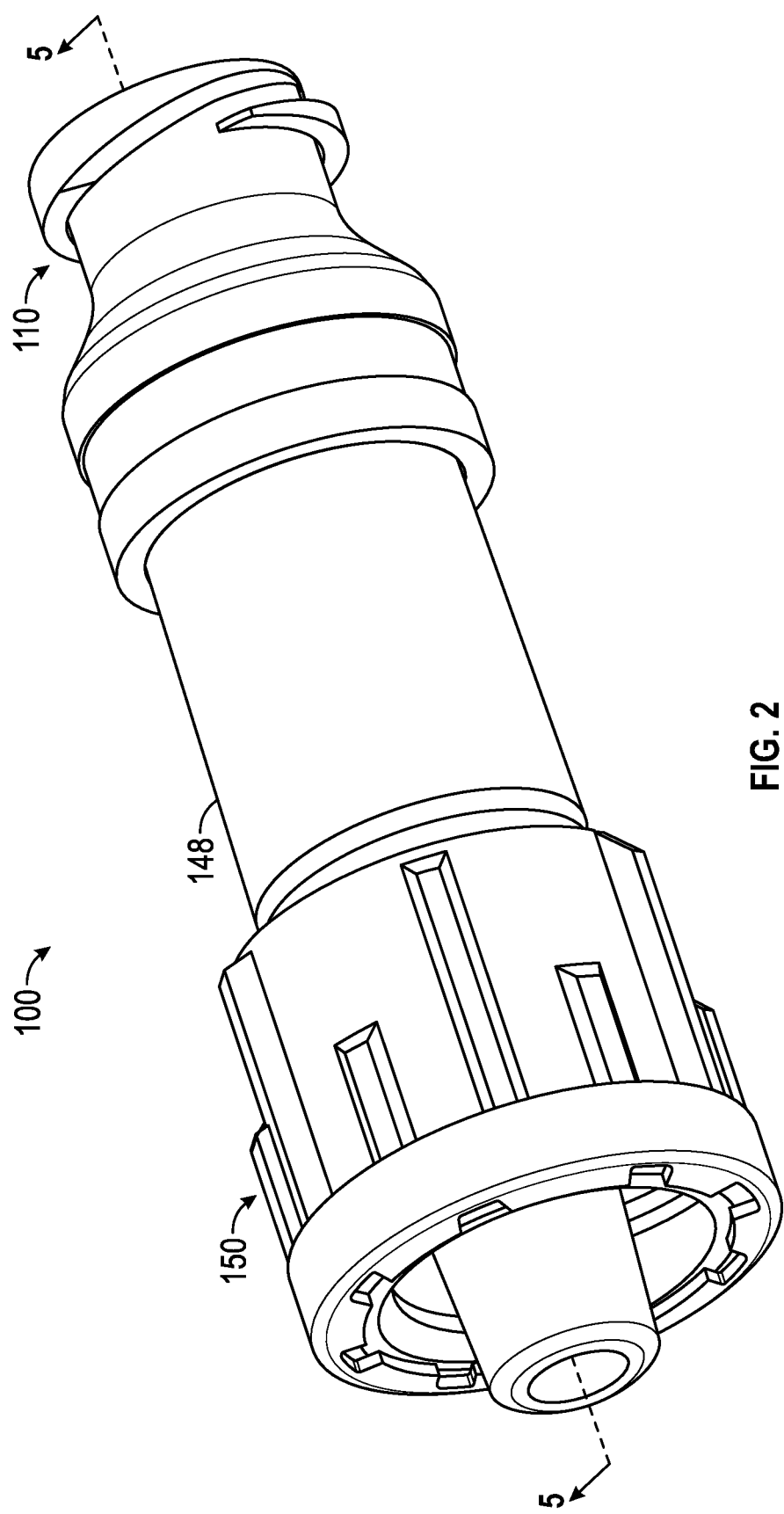
FIG. 2 illustrates a perspective view of the flow restriction device, in accordance with some embodiments of the present disclosure.
Figure 3:
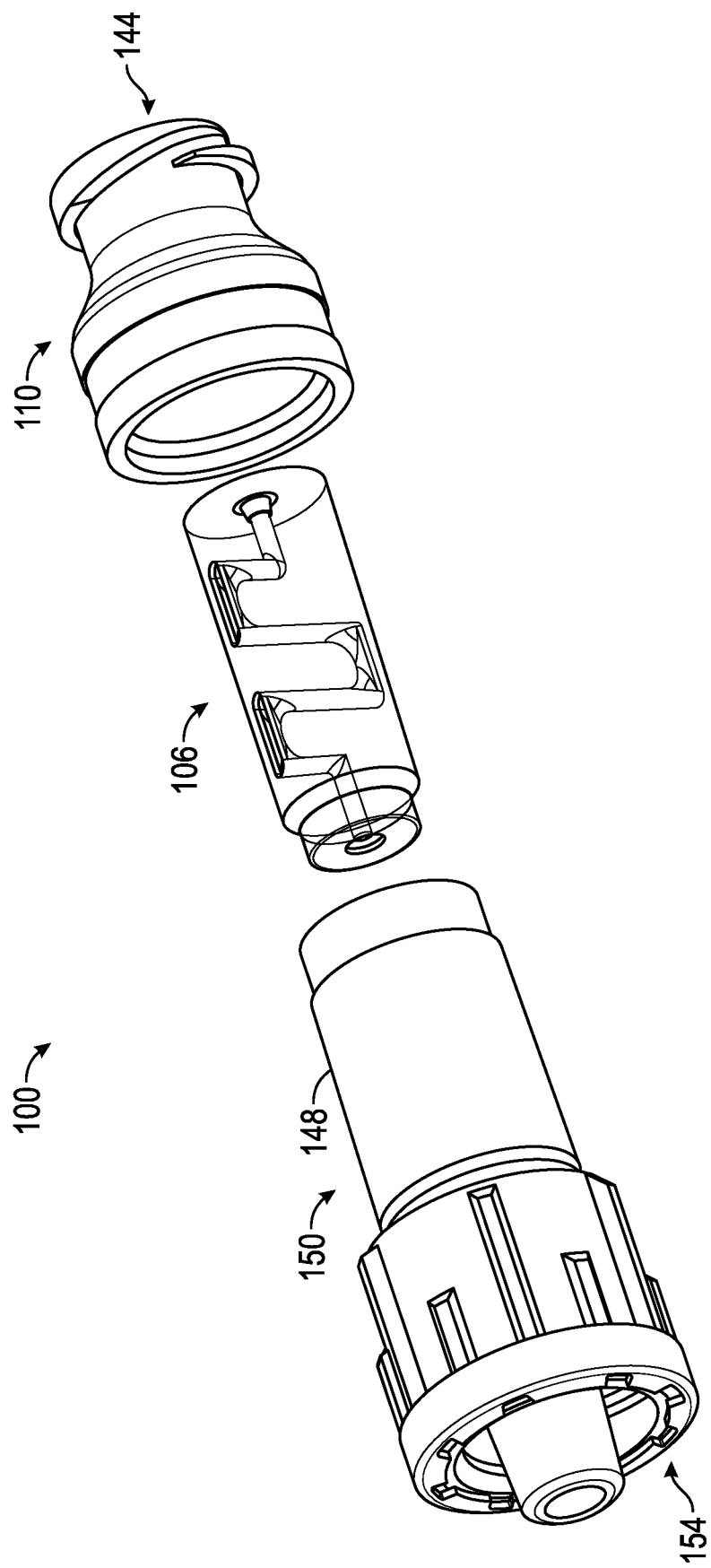
FIG. 3 illustrates an exploded view of the flow restriction device of FIG. 2, in accordance with some embodiments of the present disclosure.
Figure 4:
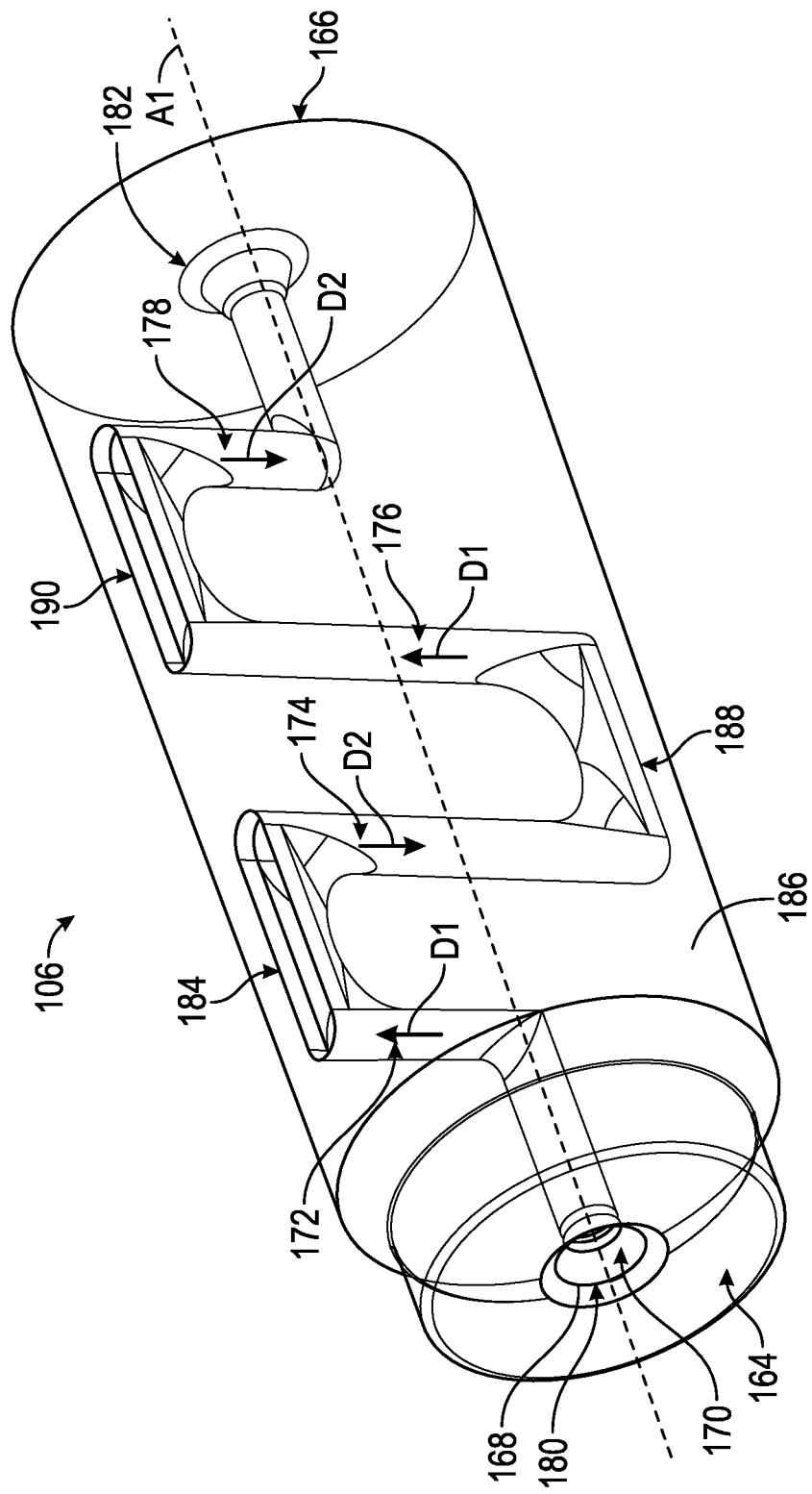
FIG. 4 illustrates a perspective view of an insert body for a flow restriction device, in accordance with some embodiments of the present disclosure.
Figure 5A:
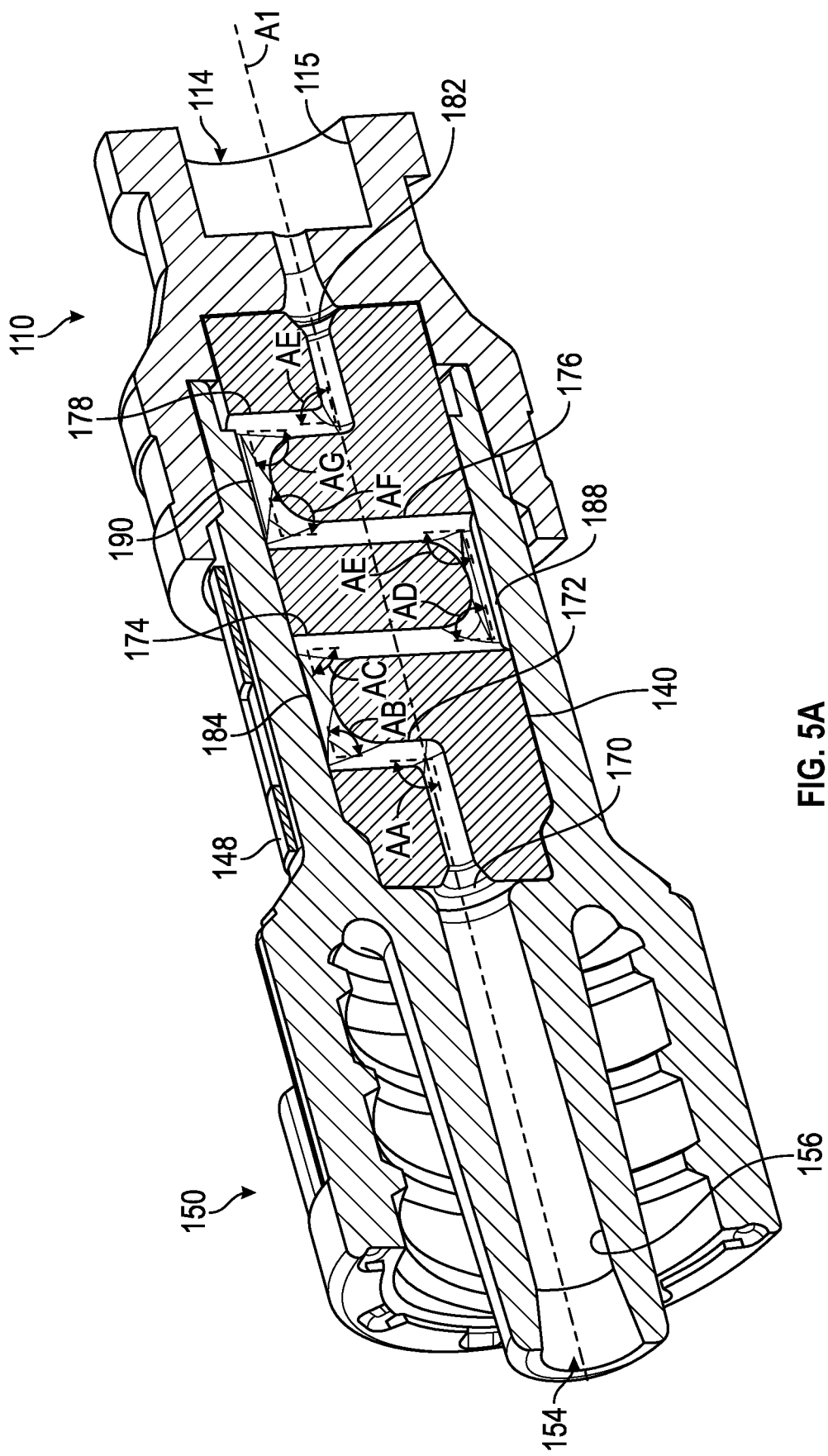
FIG. 5A illustrates a cross-sectional view of the flow restriction device of FIG. 2 along line 5-5, in accordance with some embodiments of the present disclosure.
Figure 5B:
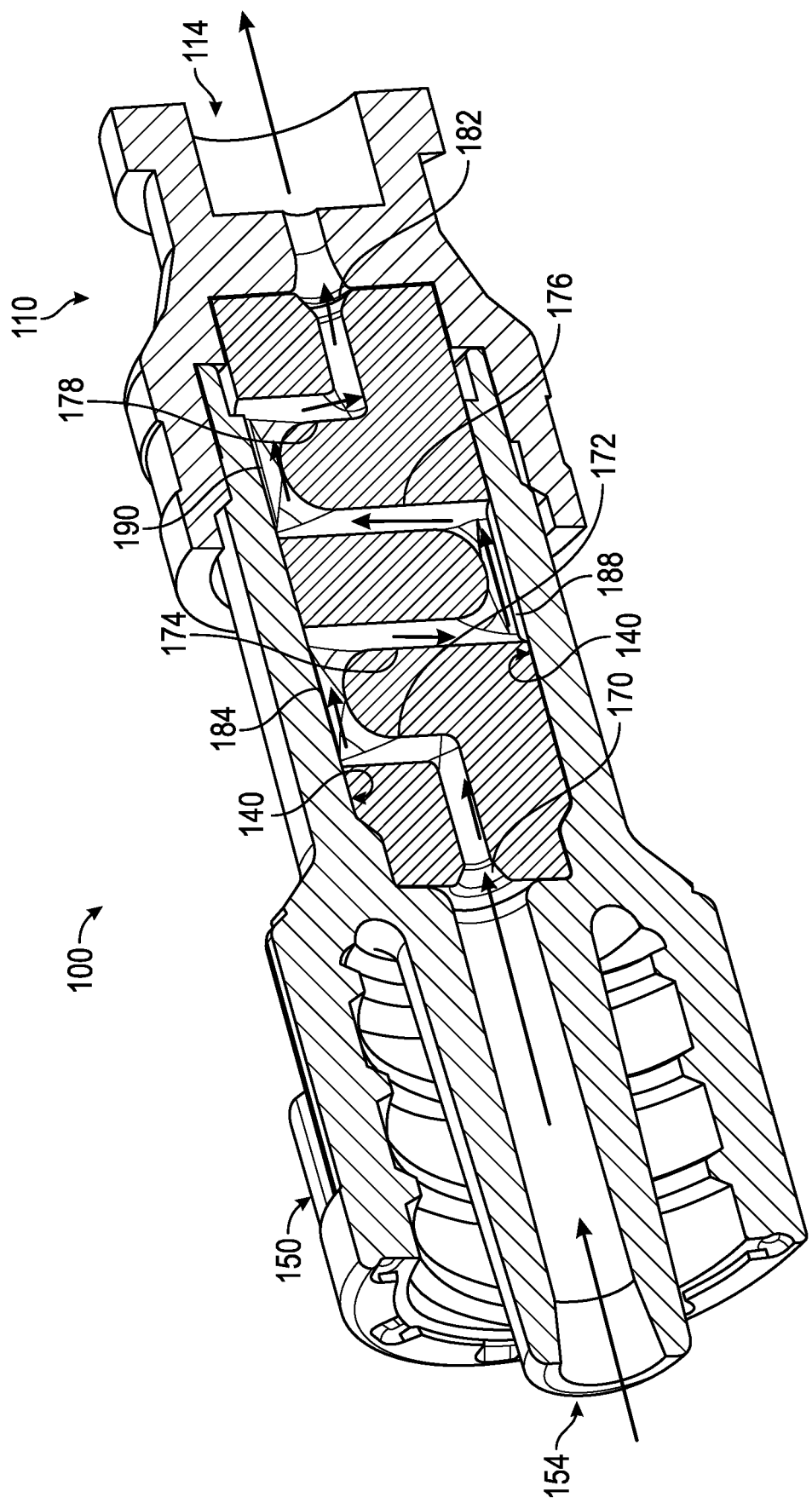
FIG. 5B illustrates another cross-sectional view of the flow restriction device of FIG. 2 along line 5-5, in accordance with some embodiments of the present disclosure.

FIG. 2 illustrates a perspective view of a flow restriction device 100, in accordance with some embodiments of the present disclosure. FIG. 3 illustrates an exploded view of the flow restriction device 100 having a housing with a first end portion and a second end portion, and an insert body. FIG. 4 illustrates a perspective view of the insert body 106 of FIG. 3. FIGS. 5A and 5B illustrate a cross-sectional view of the flow restriction device of FIG. 2, along line 5-5.

As illustrated in FIGS. 2-5B, with continued reference to FIG. 1, in some embodiments, the flow restriction device 100 includes housing 148 with a first end portion 150 and a second end portion 110. The first end portion 150 can be configured to couple to the catheter assembly 50, and the second end portion 110 can be configured to couple to fluid collection device, such as a blood collection device 40.

For example, the second end portion 110 may be integrated with the blood collection device 40 or monolithically formed with the blood collection device 40 as a single unit or piece. As another example, the second end portion 110 may be in the form of a female luer connector or another suitable connector, which may be coupled with a male luer portion of the blood collection device 40. Further, the first end portion 150 may be in the form of a male luer connector or another suitable connector, which may be coupled with a catheter or a portion of catheter assembly.

The first end portion 150 may have an internal surface 156 forming a first opening 154. The second end portion 110 may include an internal surface 115 forming a second opening 114 extending therethrough for coupling to a male luer portion of the blood collection device 40. The second opening of the 114 of the second end portion may be fluidly connected to the first opening 154 of the first end portion via a cavity 140 formed by an inner surface of the housing.

In some embodiments of the present disclosure, the first end portion 150 of the housing can be formed as any of a male and/or female luer connector with the first opening 154 extending therethrough, and the second end portion 110 of the housing can be formed as the other of a male and/or female luer connector with the second opening 114 extending therethrough. The housing 148 can comprise a material that includes a thermoplastic polymer such as a polycarbonate or another material having similar properties.

In accordance with various embodiments of the present disclosure, the first end portion 150 can be integrally formed with the housing 148 to form a single monolithic piece, and the housing 148 can be coupled to the second end portion 110. When the first and second end portions 150, 110 are assembled or are integrally formed, the first opening 154 of the first end portion is fluidly coupled to the second opening of the second end portion through the cavity 140.

The cavity 140 is configured to receive an insert body 106 therein. The insert body 106 directs a fluid flow between the first and second openings 154, 114 of the housing while inducing a resistance to the fluid flow as it moves through the insert body 106. By inducing a resistance to the fluid flow, the rate of fluid flow is reduced as the fluid moves through the insert body 106. Reducing the flow rate of a fluid, such as blood, through the flow restriction device 100 can reduce the hemolysis index of the blood.

The insert body 106 has a first end 164, a second end 166, and an inner surface 168 forming a fluid passage 170 that extends through the first and second ends 164, 166. The fluid passage 170 extends along a path between the first and second ends 164, 166 of the body, which is configured to reduce a rate of fluid flow through the insert body 106. A perspective view of the insert body 106 is illustrated in FIG. 4 with the body shown as being transparent to permit the fluid passage 170 to be visible in conjunction with the present disclosure.

In some embodiments of the present disclosure, the first end 164 of the insert body and the second end 166 of the insert body form proximal-most and distal-most surfaces of the body, respectively. The insert body 106 can also define a longitudinal axis A1 that extends through the first and second ends 164, 166. The fluid passage 170 spans between the first and second ends 164, 166 of the insert body, and is configured to extend in more than one direction along a path between the first and second ends 164, 166. Because the path extends in more than one direction, the fluid passage 170 extends indirectly between the first and second ends 164, 166 of the insert body. The indirect path between the first and second ends 164, 166 of the body can have a length that is greater than a distance between the first and second ends 164, 166 of the body.

The fluid passage 170 includes a first opening 180 through the first end 164 of the insert body, and a second opening 182 through the second end 166 of the insert body. Between the first and second openings 180, 182, the fluid passage 170 can include a third opening 184 through an outer surface 186 of the insert body. The third opening 184 extends through the outer surface 186 at a location that is between the first and second ends 164, 166. The location of the third opening 184 can be spaced apart from the first and second ends 164, 166 such that an outermost circumference of any of the first and second ends 164, 166 is uninterrupted by the third opening 184.

In some embodiments of the present disclosure, the fluid passage 170 can also include a fourth opening 188 through the outer surface 186 of the insert body. The third and fourth openings 184, 188 are positioned along the outer surface 186 of the insert body relative to the longitudinal axis A1. In some embodiments of the present disclosure, the third and fourth openings 184, 188 are positioned along the outer surface 186 of the insert body such that the third and fourth openings 184, 188 are spaced apart in a radial direction around the longitudinal axis A1 of the insert body. For example, the third and fourth openings 184, 188 can be spaced apart by an angle of between approximately 10 degrees and approximately 180 degrees, relative to the longitudinal axis A1. In some aspects of the present disclosure, the third and fourth openings 184, 188 are spaced apart by an angle of approximately 180 degrees.

The fluid passage 170 can also include a fifth opening 190 through the outer surface 186 of the insert body. In such embodiments, the third and fifth openings 184, 190 can be spaced apart in a direction along the longitudinal axis A1 of the insert body, with the fourth opening 188 positioned between the third and fifth openings 184, 190.

The insert body 106 can be configured with the third, fourth, and fifth openings 184, 188, 190 positioned in any radial orientation relative to each other. In some embodiments of the present disclosure, such as the embodiment illustrated in FIGS. 4 and 5A, the third and fifth openings 184, 190 are radially aligned relative to the longitudinal axis A1, and the fourth opening 188 is spaced apart in a radial direction around the longitudinal axis A1 by an angle. The fourth opening 188 can be spaced apart from any of the third and fifth openings 184, 190 by an angle of between approximately 10 degrees and approximately 180 degrees. In some aspects of the present disclosure, the fourth opening 188 is spaced apart of the third and fifth openings 184, 190 by an angle of approximately 180 degrees.

Referring to FIGS. 4-5B, the fluid passage 170 can include a first portion 172 that extends in a first direction D1 away from the longitudinal axis A1. A second portion 174 of the fluid passage extends from the first portion 172 in a second direction D2 toward the longitudinal axis A1. The second portion 174 of the fluid passage can extend past the longitudinal axis A1, and a third portion of the fluid passage can extend from the second portion 174 in the first direction D1 toward the longitudinal axis A1.

In some embodiments of the present disclosure, the fluid passage 170 comprises a fourth portion 178 that extends from the third portion 176 in a second direction D2 toward the longitudinal axis A1. In such embodiments, the second opening 182 of the fluid passage is fluidly coupled to the fourth portion 178.

The change in direction of the fluid passage 170 between the first and second ends 164, 166 of the insert body can be configured by an angle between one or more portion of the fluid passage 170. In some instances, the fluid passage 170 can have a change in direction by an angle between approximately 45 degrees and approximately 90 degrees. The changes in direction of the fluid passage 170 can form a line that represents a periodic wave, such as a square wave. The changes in direction of the fluid passage are optimized to reduce pressure of a fluid, e.g., blood, moving through the fluid passage 170 by inducing resistance to the fluid. Since the decreased blood flow rate causes a reduction in shear stress experienced by the red blood cells of the blood, a risk of hemolysis during blood collection may advantageously be reduced.

In some embodiments of the present disclosure, the fluid passage 170 includes eight changes in direction, where each change in direction is approximately 90 degrees. Referring to FIGS. 5A and 5B, an angle between any of the first, second, third, and fourth portions 172, 174, 176, 178, and any of the third, fourth, and fifth openings 184, 188, 190 of the fluid passage 170 is illustrated as approximately 90 degrees. An angle AA between the fluid passage 170 at the first opening 180 and the first portion 172 is approximately 90 degrees, an angle AB between the first portion 172 and the fluid passage 170 along the first opening 180 is approximately 90 degrees, an angle AC between the fluid passage 170 along the third opening 184 and the second portion 174 is approximately 90 degrees, an angle AD between the second portion 174 and the fluid passage 170 along the fourth opening 188 is approximately 90 degrees, an angle AE between the fluid passage 170 along the fourth opening 188 and the third portion 176 is approximately 90 degrees, an angle AF between the third portion 176 and the fluid passage 170 along the fifth opening 190 is approximately 90 degrees, an angle AG between the fluid passage 170 along the fifth opening 190 and the fourth portion 178 is approximately 90 degrees, and an angle AE between the fourth portion 178 and the fluid passage 170 at the second opening 182 is approximately 90 degrees.

Referring to FIG. 5B, movement of a fluid through the flow restriction device 100 and along the path of the fluid passage 170 is illustrated by arrows. Although the arrows illustrate movement of a fluid through the flow restriction device 100 in a direction from the first end portion 150 to the second end portion 110, it should be understood that the present disclosure contemplates that a fluid can move through the flow restriction device 100 in a direction from the second end portion 110 to the first end portion 150.

When the insert body 106 is positioned within the cavity 140 of the housing, at least a portion of the outer surface 186 of the insert body engages against the inner surface of the housing that forms the cavity 140. A segment of the fluid passage 170 at any of the third, fourth, and fifth openings 184, 188, 190 is at least partially formed by the inner surface of the housing 148.

Figure 6:
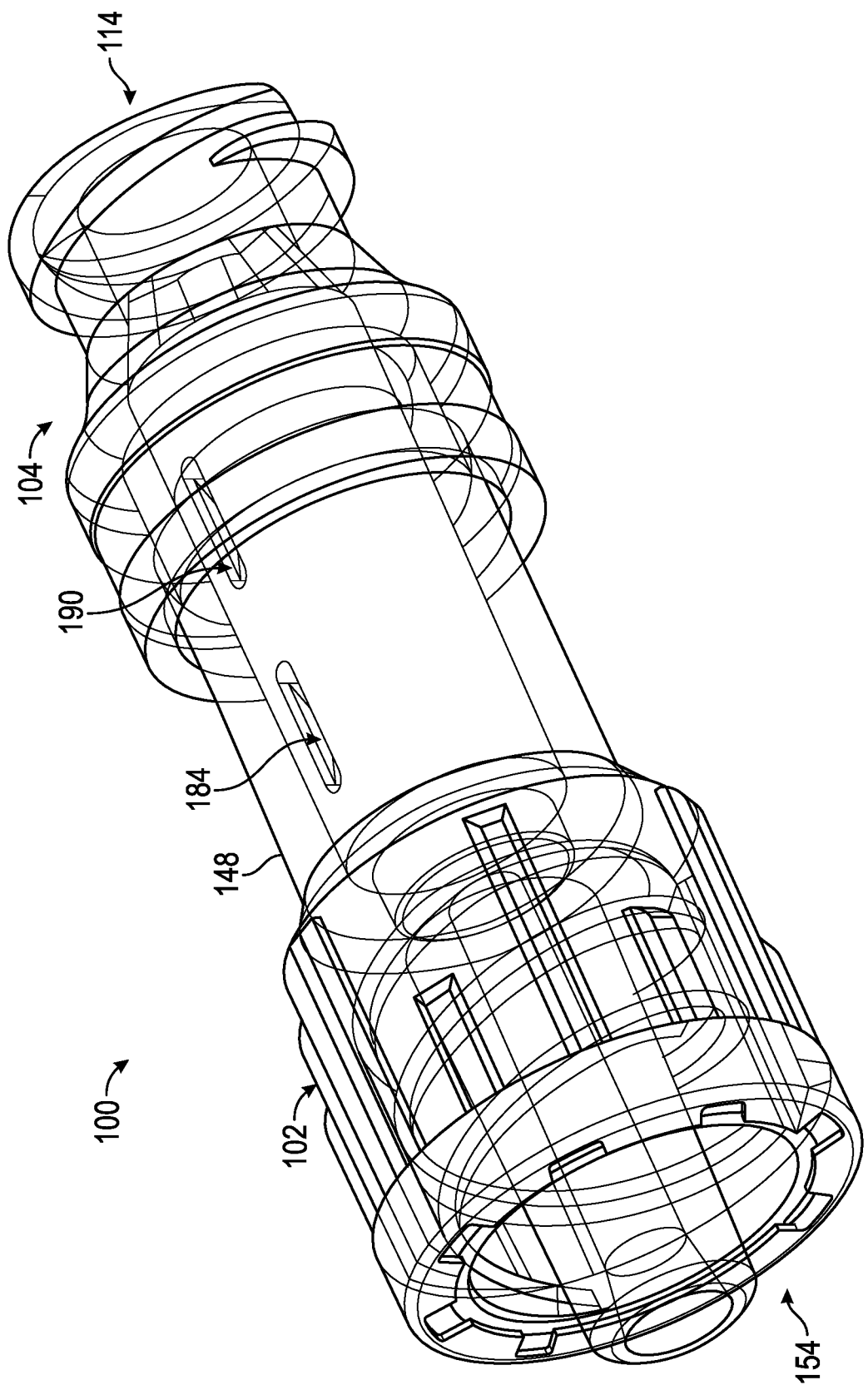
FIG. 6 illustrates a perspective view of a flow restriction device, in accordance with some embodiments of the present disclosure.

The housing 148, or portion thereof, can comprise a transparent material to permit observation of a fluid in the fluid passage 170. A housing comprising a transparent material is illustrated in FIG. 6, where the third opening 184, the fourth opening 188 (not shown), and the fifth opening 190 of the fluid passage are visible through the outer surface of the housing.

In some embodiments, a portion of the housing 148 comprises a transparent material forming a window through the housing. The window can be positioned between the first and second openings 154, 114 of the housing, at a location the is aligned with any of the third, fourth, and fifth openings 184, 188, 190 of the insert body positioned in the cavity 140 of the housing. In some embodiments, the housing 148 comprises three windows, each aligned with a respective one of the third, fourth, and fifth openings 184, 188, 190 of the insert body. In yet other embodiments of the present disclosure, the window can extend around a circumference of the housing such that the third, fourth, and/or fifth openings 184, 188, 190 are each longitudinally aligned a window in any rotational orientation of the insert body relative to the housing.

An insert body 107 can be configured, in some embodiments of the present disclosure, to include a material that is flexible, relative to other portions of the insert body or the housing. The flexible material can provide a seal between the insert body and the housing. The insert body 107 can be partially or entirely formed of the flexible material, or the insert body 107 is over-molded with the flexible material. In some aspects of the present disclosure, the flexible material is an elastomer, such as silicone rubber, or a similar material that can provide a fluid seal between the insert body and the housing.

Figure 7:
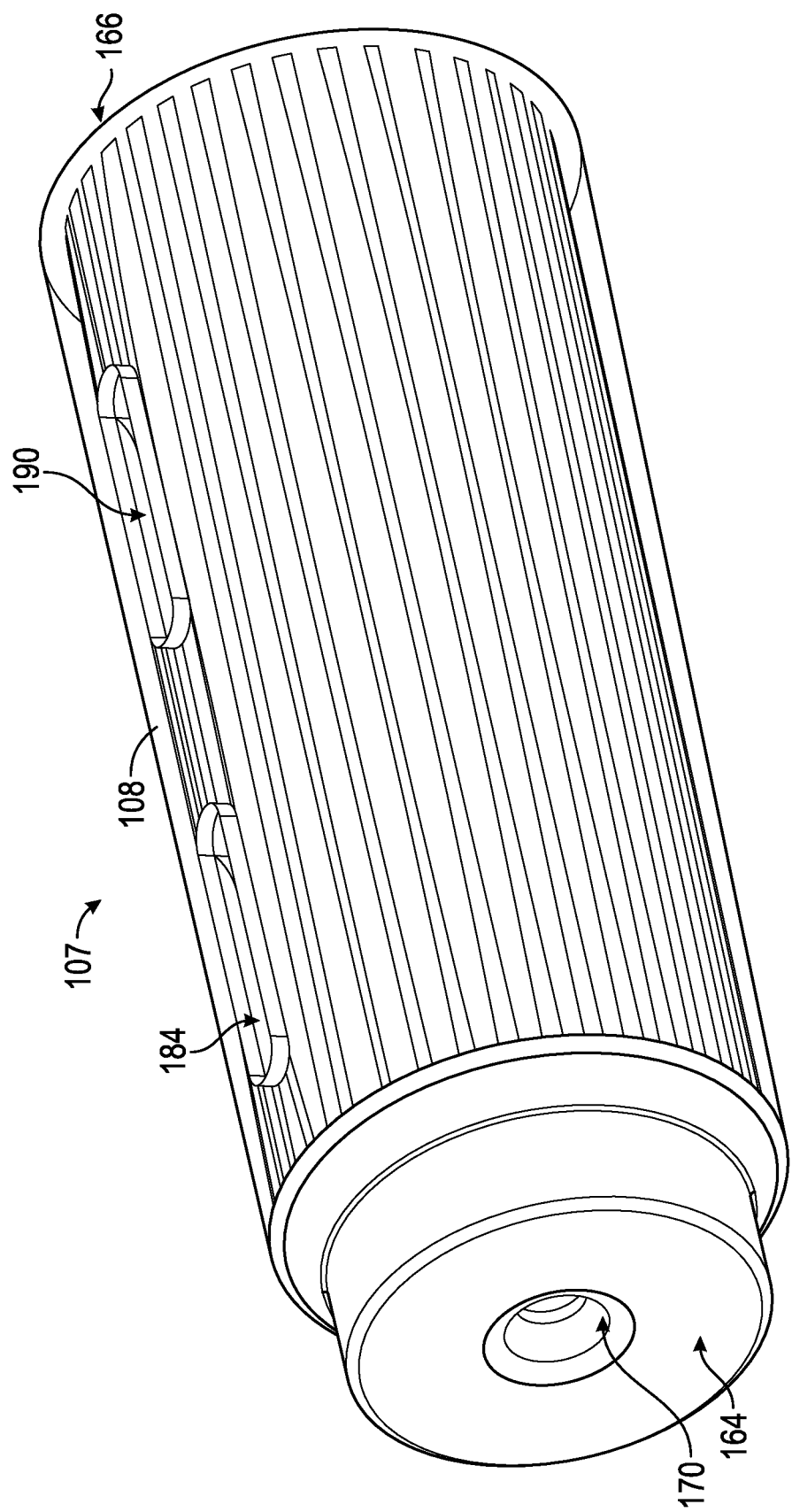
FIG. 7 illustrates a perspective view of an insert body for a flow restriction device, in accordance with some embodiments of the present disclosure.
Figure 8:
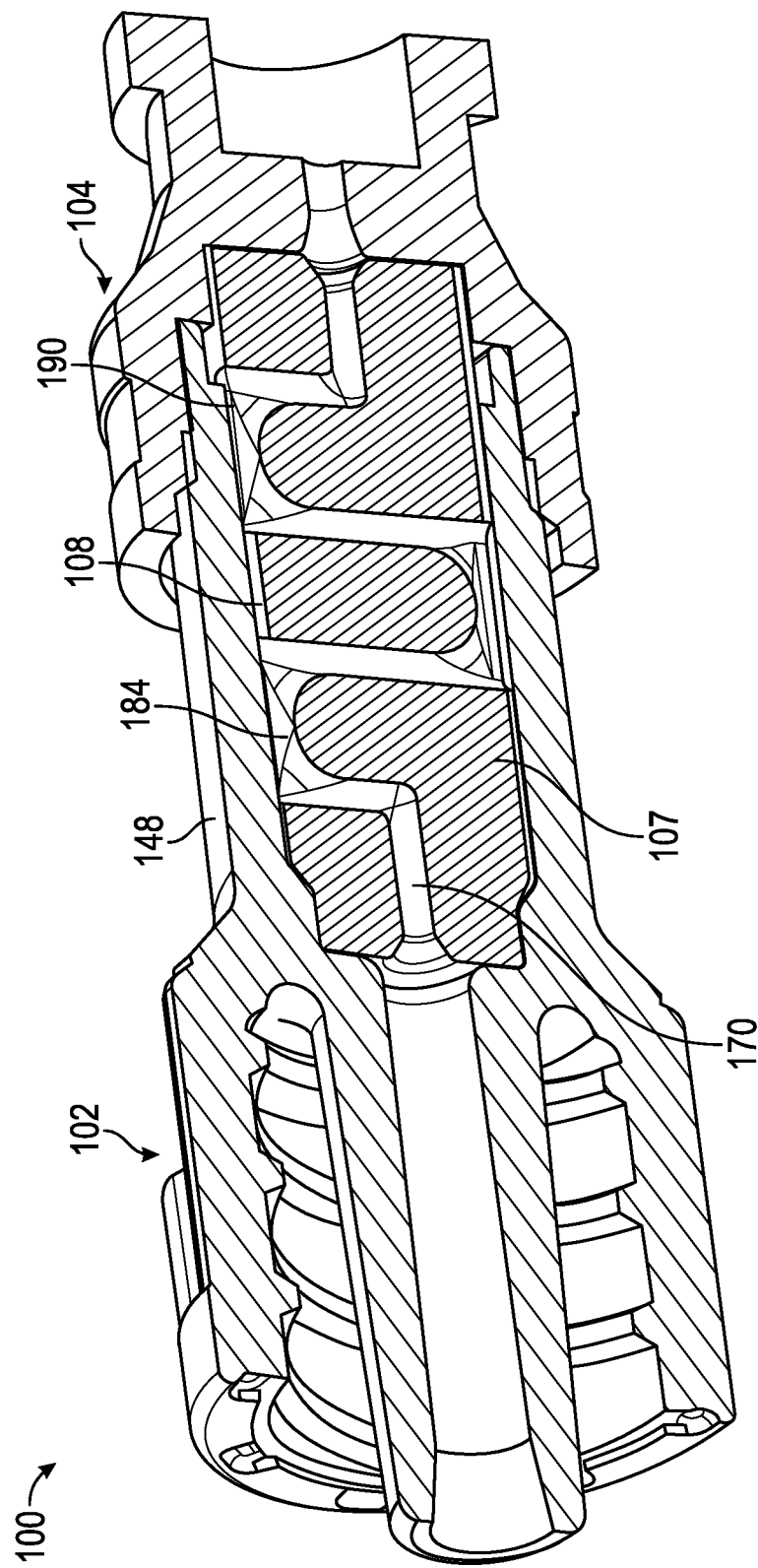
FIG. 8 illustrates a cross-sectional view of a flow restriction device, in accordance with some embodiments of the present disclosure.

Referring to FIG. 7, an insert body 107 formed of a silicone material is illustrated. The silicone extends along the outer surface of the insert body 107 and can engage against an inner surface of the housing 148 when the insert body 107 is positioned with in the cavity 140 of the housing. Engagement of the silicone 108 against the inner surface of the housing 148, as illustrated in FIG. 8, provides a seal that can resist a fluid from moving out of an opening of the fluid passage 170, such as the third, fourth, and fifth openings 184, 188, 190.

Figure 9:
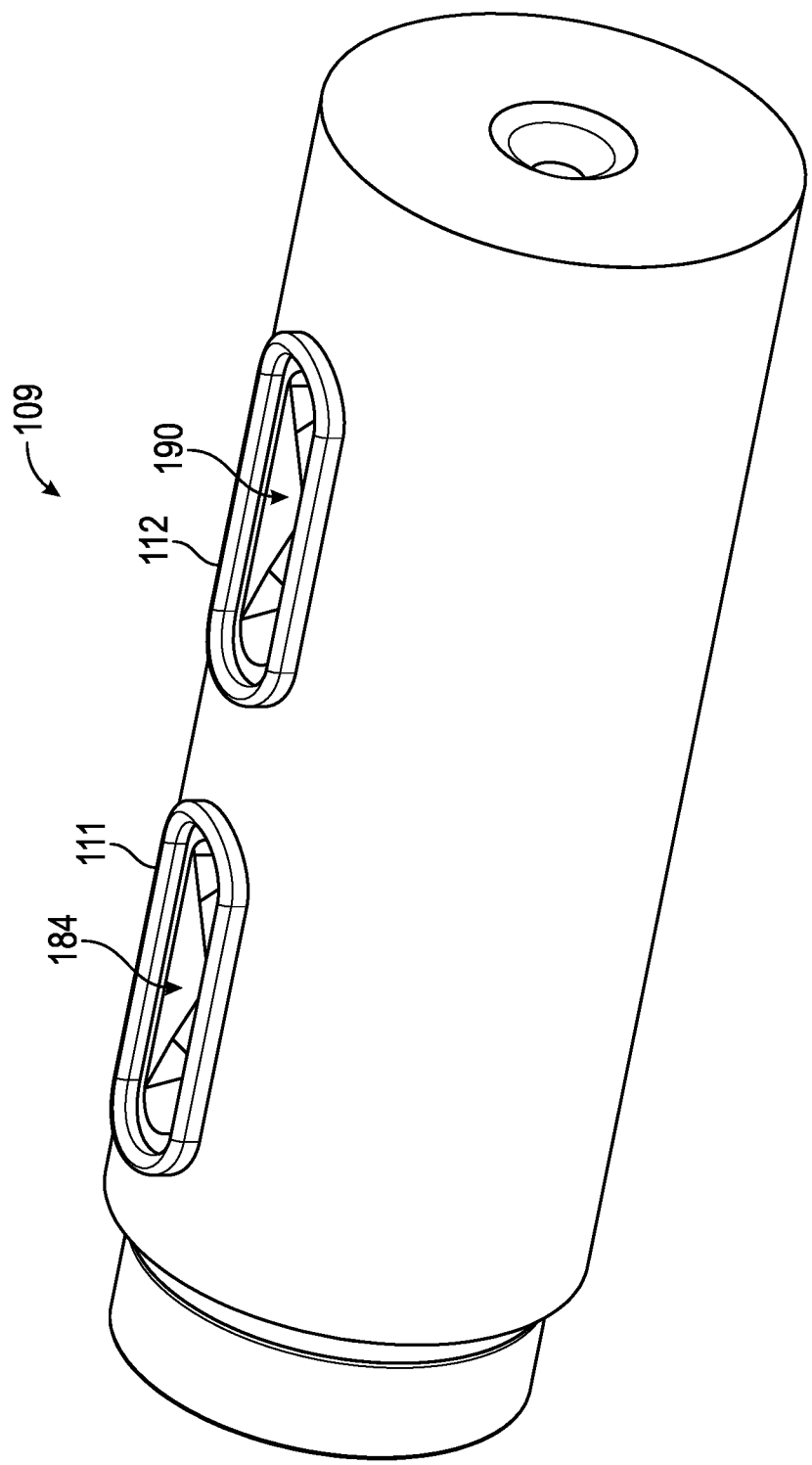
FIG. 9 illustrates a perspective view of an insert body for a flow restriction device, in accordance with some embodiments of the present disclosure.

In some embodiments of the present disclosure, an insert body 109 can include a wall 111 that extends in a direction away from the outer surface of the insert body, as illustrated in FIG. 9. The wall 111 is configured to engage against an inner surface of the housing 148 when the insert body 109 is positioned with in the cavity 140 of the housing to provide a seal that resists a fluid from moving out of an opening of the fluid passage 170.

The wall 111 is positioned to extend around an opening of the fluid passage 170, such as the third, fourth, and fifth openings 184, 188, 190. The wall 111 can have a height that extends in a direction away from an outer surface of the insert body, and a length that extends around the opening of the fluid passage 170. In some aspects, the insert body 109 includes a first wall 111 that extends around the third opening 184 of the insert body, a second wall 112 that extends around the fifth opening 190 of the insert body, and a third wall that extends around the fourth opening of the insert body.

Figure 10:
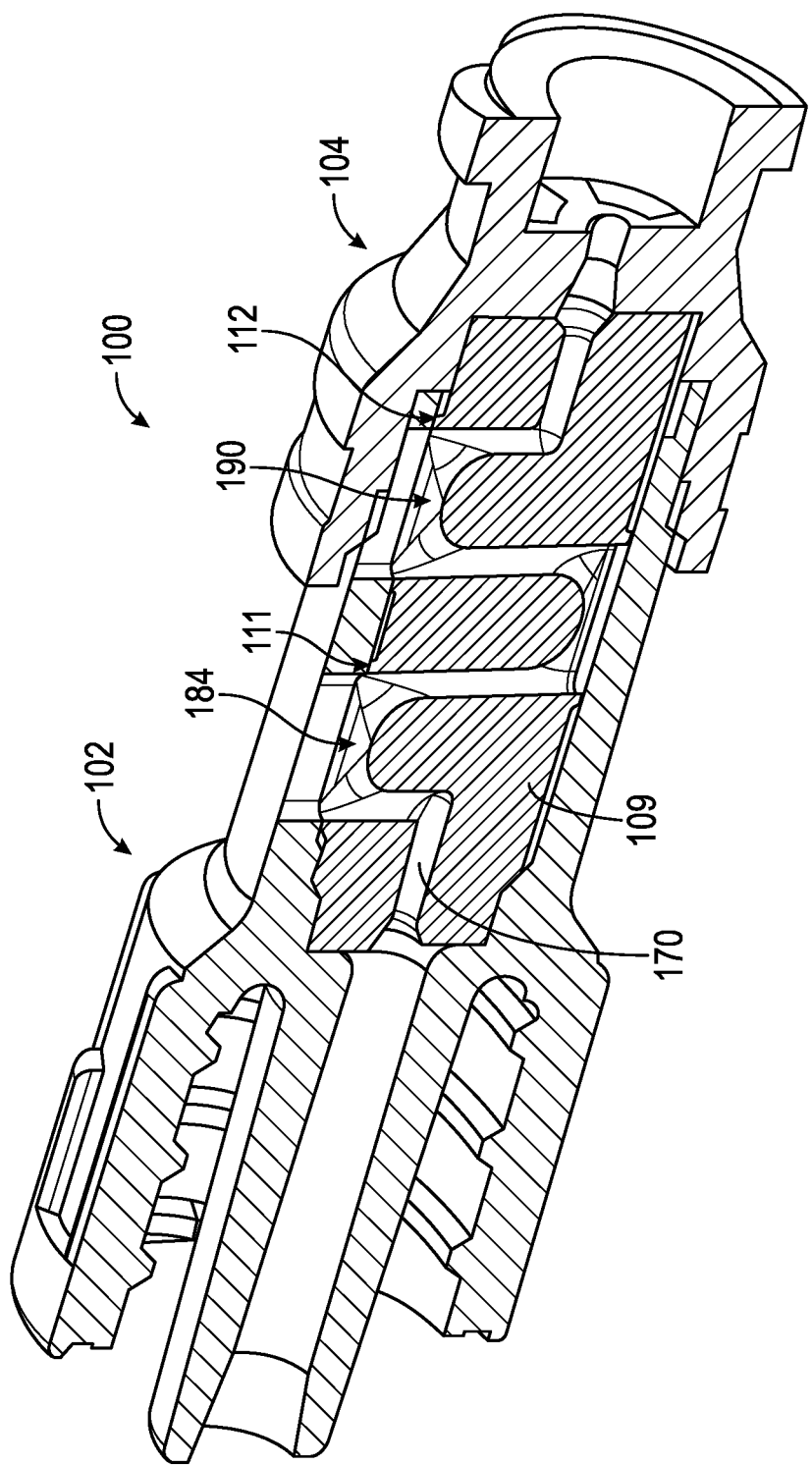
FIG. 10 illustrates a cross-sectional view of a flow restriction device, in accordance with some embodiments of the present disclosure.

When the insert body 109 is positioned in the cavity 140 of the housing, as illustrated in FIG. 10, any of the walls 111, 112 of the insert body can engage against an inner surface of the housing 148 to resist a fluid from moving out of an opening of the fluid passage 170, such as the third, fourth, and fifth openings 184, 188, 190. In some embodiments of the present disclosure, a wall 111, 112 is compressed or crushed when the insert body 109 is positioned in the housing 148.

Another aspect of the flow restriction device 100 of the present disclosure is the optimization of manufacturability for insert body 106, 107, 109. The insert body 106, 107, 109 can be manufactured using an efficient molding process in which core pins are positioned in a mold to form the fluid passage 170. The core pins can be positioned to form the fluid passage while permitting easy removal of the core pins after the insert body is molded, and which may not cause damage to the fluid passage or core pins. In some aspects of the present disclosure, each core pin comprises two protrusions, where each protrusion is configured to form at least a portion of the fluid passage 170.

Figure 11:
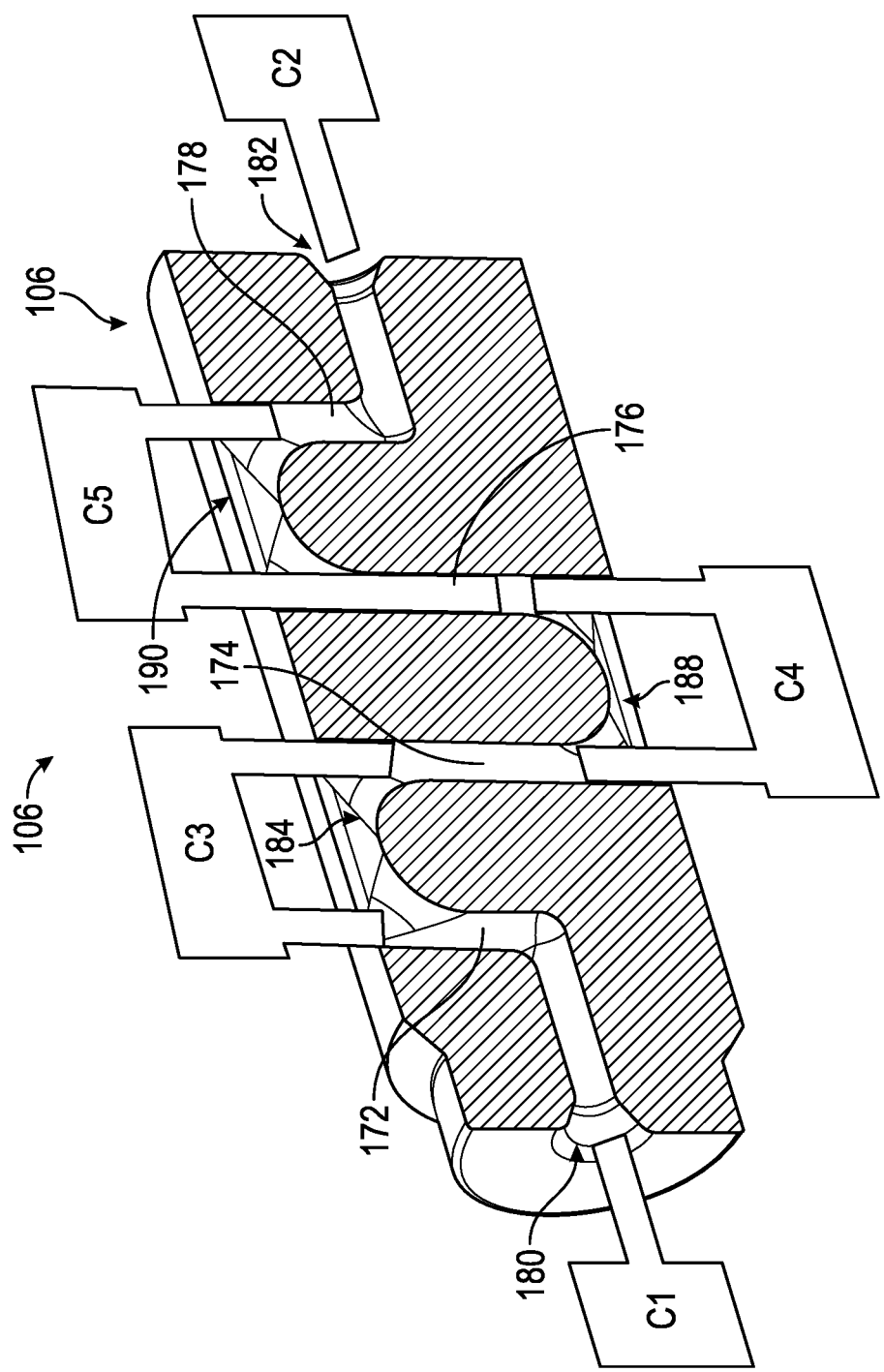
FIG. 11 illustrates a cross-sectional view of an insert body for a flow restriction device, in accordance with some embodiments of the present disclosure.

In FIG. 11, the core pins are generally illustrated adjacent to the insert body 106. As illustrated, first and second core pins C1, C2 can be positioned in a mold to form the first and second openings 180, 182, respectively. A third core pin C3 can be positioned between the first and second core pins C1, C2 in the mold to form the first portion 172, the third opening 184 of the insert body, and the second portion 174 of the fluid passage. A fourth core pin C4 can be positioned in the mold to form the second portion 174, the fourth opening 188, and the third portion 176 of the fluid passage. A fifth core pin C5 can be positioned in the mold to form the third portion 176, the fifth opening 190, and the fourth portion 178 of fourth portion 178.'

Illustration of Subject Technology as Clauses

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1 or clause 5. The other clauses can be presented in a similar manner.

Clause 1. A flow restriction device, comprising: a housing comprising a first end portion, a second end portion, an inner surface forming a cavity between the first and second end portions, a first opening through the first end portion, and a second opening through the second end portions; and an insert body comprising a first end, a second end, a longitudinal axis extending through the first and second ends, and an inner surface forming a fluid passage extending between the first and second ends, the fluid passage comprising a first portion that extends in a first direction away from the longitudinal axis, a second portion that extends in a second direction toward the longitudinal axis, and a third portion that extends in the first direction; wherein the insert body is positioned within the cavity with a first opening of the fluid passage fluidly coupled with the first opening of the housing, and the second opening of the fluid passage fluidly coupled with the second opening of the housing.

Clause 2. The flow restriction device of Clause 1, wherein the fluid passage comprises a fourth portion that extends in a third direction, and wherein the third direction is different than the first and second directions.

Clause 3. The flow restriction device of Clause 2, wherein the third direction is parallel to the longitudinal axis.

Clause 4. The flow restriction device of Clause 2, wherein the fourth portion is positioned between any of the first and second portions, and the second and third portions of the fluid passage.

Clause 5. The flow restriction device of Clause 2, wherein at least a portion of any of the first, second, third, and fourth portions of the fluid passage extends through an outer surface of the insert body.

Clause 6. The flow restriction device of Clause 2, wherein at least a portion of any of the first, second, third, and fourth portions of the fluid passage is formed by the inner surface of the housing.

Clause 7. The flow restriction device of any of Clauses 1 to 6, wherein an angle between any of the first, second, and third portions of the fluid passage is between approximately 45 degrees and approximately 180 degrees.

Clause 8. The flow restriction device of any of Clauses 1 to 7, wherein an angle between any of the first, second, and third portions of the fluid passage is approximately 90 degrees.

Clause 9. The flow restriction device of any of Clauses 1 to 8, wherein the fluid passage comprises a fourth portion that extends in the second direction.

Clause 10. The flow restriction device of Clause 9, wherein an angle between each of the first, second, third, and fourth portions of the fluid passage is approximately 90 degrees.

Clause 11. The flow restriction device of any of Clauses 1 to 10, wherein the first opening of the fluid passage extends through the first end of the insert body, and the second opening of the fluid passage extends through the second end of the insert body.

Clause 12. The flow restriction device of any of Clauses 1 to 11, wherein at least a portion of the housing comprises a transparent material, and any of the first, second, and third portions of the fluid passage is engaged against the inner surface of the housing having the transparent material, such that the fluid passage is visible through an outer surface of the housing.

Clause 13. The flow restriction device of any of Clauses 1 to 12, wherein the housing comprises a window extending through an outer surface of the housing, between the first and second end portions of the housing, and wherein any of the first, second, and third portions of the fluid passage is engaged against the inner surface of the housing at the window, such that the fluid passage is visible through the window.

Clause 14. The flow restriction device of Clause 13, wherein the window is formed by a transparent portion of the housing.

Clause 15. The flow restriction device of any of Clauses 1 to 14, wherein the insert body comprises a wall having a height that extends in a direction away from an outer surface of the insert body, and a length that extends around a portion of any of the first, second, and third portions of the fluid passage extending through the outer surface of the insert body.

Clause 16. The flow restriction device of any of Clauses 1 to 15, wherein an outer surface of the insert body comprises a silicone material.

Clause 17. The flow restriction device of any of Clauses 1 to 16, wherein the first end portion of the housing forms any of a male luer or a female luer, and the second end portion of the housing forms the other of the male luer or the female luer.

Clause 18. The flow restriction device of any of Clauses 1 to 17, wherein the fluid passage comprises a cross sectional area that decreases from the first end of the insert body toward the second end of the insert body.

Clause 19. The flow restriction device of any of Clauses 1 to 18, wherein the fluid passage comprises a cross sectional area that decreases from the second end of the insert body toward the first end of the insert body.

Clause 20. A flow restriction device, comprising: a housing comprising a first end portion, a second end portion, an inner surface forming a cavity between the first and second end portions, a first opening through the first end portion, and a second opening through the second end portions; and an insert body comprising a first end, a second end, an outer surface extending between the first and second ends, and an inner surface forming a fluid passage extending between the first and second ends, the fluid passage having a first opening through the first end of the insert body, a second opening through the second end of the insert body, and a third opening through the outer surface; wherein the insert body is positioned within the cavity with the first opening of the fluid passage fluidly coupled with the first opening of the housing, the second opening of the fluid passage fluidly coupled with the second opening of the housing, and the third opening obstructed by the inner surface of the housing.

Clause 21. The flow restriction device of Clause 20, wherein the fluid passage comprises a fourth opening through the outer surface, and wherein the fourth opening is spaced apart from the third opening in a direction that is parallel with a longitudinal axis extending through the first and second ends of the insert body.

Clause 22. The flow restriction device of any of Clauses 20 and 21, wherein the fluid passage comprises a fourth opening through the outer surface, and wherein the fourth opening is spaced apart from the third opening in a radial direction around a longitudinal axis extending through the first and second ends of the insert body.

Clause 23. The flow restriction device of Clause 22, wherein the fourth opening is radially spaced apart from the third opening by an angle of approximately 180 degrees.

Clause 24. The flow restriction device of any of Clauses 20 to 23, wherein a portion of the fluid passage along the third opening is formed by the inner surface of the housing.

Clause 25. The flow restriction device of any of Clauses 20 to 24, wherein the fluid passage comprises a fourth opening through the outer surface and a fifth opening through the outer surface, and wherein any of the third, fourth, and fifth openings are spaced apart from each other relative to a longitudinal axis extending through the first and second ends of the insert body.

Clause 26. The flow restriction device of any of Clauses 20 to 25, wherein the housing comprises a window extending through an outer surface of the housing, between the first and second end portions of the housing, and wherein the third opening of the fluid passage is aligned with the window, such that the fluid passage is visible through the window.

Clause 27. The flow restriction device of Clause 26, wherein the window is formed by a transparent portion of the housing.

Clause 28. The flow restriction device of Clause 26, wherein the insert body comprises a wall having a height that extends in a direction away from an outer surface of the housing, and a length that extends around the third opening through the outer surface.

Clause 29. The flow restriction device of any of Clauses 20 to 28, wherein an outer surface of the insert body comprises a silicone material.

Clause 30. The flow restriction device of any of Clauses 20 to 29, wherein the first end portion of the housing forms any of a male luer or a female luer, and the second end portion of the housing forms the other of the male luer or the female luer.

Clause 31. A peripheral intravenous catheter assembly configured to limit hemolysis during the drawing of blood from a patient, comprising: a flow restriction device, comprising, a housing comprising a first end portion a first end portion, a second end portion, an inner surface forming a cavity between the first and second end portions, a first opening through the first end portion, wherein the first end portion is configured to couple to a catheter assembly, and the second end portion is configured to couple to a fluid collection device; an insert body comprising a first end, a second end, a longitudinal axis extending through the first and second ends, and an inner surface forming a fluid passage extending between the first and second ends, the fluid passage comprising a first portion that extends in a first direction away from the longitudinal axis, a second portion that extends in a second direction toward the longitudinal axis, and a third portion that extends in the first direction; wherein the insert body is positioned within the cavity with a first opening of the fluid passage fluidly coupled with the first opening of the housing, and a second opening of the fluid passage fluidly coupled with the second opening of the housing to limit hemolysis of blood drawn from a patient from the first end portion of the housing into the fluid collection device via the second end portion of the housing; a catheter hub having a proximal end and a distal end; and a fluid connector that fluidly couples the catheter hub with the flow restriction device.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, or operations in the processes or methods disclosed are illustrations of exemplary approaches. Based upon implementation preferences or scenarios, it is understood that the specific order or hierarchy of steps, operations or processes may be rearranged. Some of the steps, operations or processes may be performed simultaneously. In some implementation preferences or scenarios, certain operations may or may not be performed. Some or all of the steps, operations, or processes may be performed automatically, without the intervention of a user. The accompanying method claims present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A flow restriction device, comprising:
a housing comprising a first end portion, a second end portion, an inner surface forming a cavity between the first and second end portions, a first opening through the first end portion, and a second opening through the second end portion; and
an insert body comprising a first end, a second end, a longitudinal axis extending through the first and second ends, and an inner surface forming a fluid passage extending between the first and second ends, the fluid passage comprising a first portion that extends in a first direction away from the longitudinal axis, a second portion that extends in a second direction toward the longitudinal axis, and a third portion that extends in the first direction;
wherein the insert body is positioned within the cavity with a first opening of the fluid passage fluidly coupled with the first opening of the housing, and a second opening of the fluid passage fluidly coupled with the second opening of the housing, a third opening of the fluid passage formed by a fourth portion of the fluid passage that extends through an outer surface of the insert body, and a fourth opening of the fluid passage formed by a fifth portion of the fluid passage that extends through an outer surface of the insert body, wherein the fourth opening is spaced apart from the third opening.

2. The flow restriction device of claim 1, wherein the fourth portion extends in a third direction, and wherein the third direction is different than the first and second directions.

3. The flow restriction device of claim 2, wherein the third direction is parallel to the longitudinal axis.

4. The flow restriction device of claim 1, wherein the fourth portion is positioned between any of the first and second portions, and the second and third portions of the fluid passage.

5. The flow restriction device of claim 1, wherein at least a portion of the fourth portion of the fluid passage is formed by the inner surface of the housing.

6. The flow restriction device of claim 1, wherein an angle between any of the first, second, and third portions of the fluid passage is between approximately 45 degrees and approximately 180 degrees.

7. The flow restriction device of claim 1, wherein an angle between any of the first, second, and third portions of the fluid passage is approximately 90 degrees.

8. The flow restriction device of claim 1, wherein the fluid passage comprises a fourth portion that extends in the second direction.

9. The flow restriction device of claim 1, wherein at least a portion of the housing comprises a transparent material, and any of the fourth and fifth portions of the fluid passage is engaged against the inner surface of the housing having the transparent material, such that the fluid passage is visible through an outer surface of the housing.

10. The flow restriction device of claim 1, wherein the insert body comprises a wall having a height that extends in a direction away from an outer surface of the insert body, and a length that extends around a portion of any of the fourth and fifth portions of the fluid passage extending through the outer surface of the insert body.

11. The flow restriction device of claim 1, wherein the fluid passage comprises a crossectional area that decreases from the first end of the insert body toward the second end of the insert body.

12. The flow restriction device of claim 1, wherein the fluid passage comprises a crossectional area that decreases from the second end of the insert body toward the first end of the insert body.

13. The flow restriction device of claim 1, wherein any of the fourth and fifth portions of the fluid passage are spaced apart from the first and second ends of the insert body.

14. A flow restriction device, comprising:
a housing comprising a first end portion, a second end portion, an inner surface forming a cavity between the first and second end portions, a first opening through the first end portion, and a second opening through the second end portion-portions; and
an insert body comprising a first end, a second end, an outer surface extending between the first and second ends, and an inner surface forming a fluid passage extending between the first and second ends, the fluid passage having a first opening through the first end of the insert body, a second opening through the second end of the insert body, a third opening through the outer surface, and a fourth opening through the outer surface, wherein the fourth opening is spaced apart from the third opening;
wherein the insert body is positioned within the cavity with the first opening of the fluid passage fluidly coupled with the first opening of the housing, the second opening of the fluid passage fluidly coupled with the second opening of the housing, and the third opening obstructed by the inner surface of the housing.

15. The flow restriction device of claim 14, wherein the fourth opening is spaced apart from the third opening in a direction that is parallel with a longitudinal axis extending through the first and second ends of the insert body.

16. The flow restriction device of claim 14, wherein the fourth opening is spaced apart from the third opening in a radial direction around a longitudinal axis extending through the first and second ends of the insert body.

17. The flow restriction device of claim 14, wherein a portion of the fluid passage along any of the third opening and the fourth opening is formed by the inner surface of the housing.

18. The flow restriction device of claim 14, wherein the fluid passage comprises a fifth opening through the outer surface, and wherein any of the third, fourth, and fifth openings are spaced apart from each other relative to a longitudinal axis extending through the first and second ends of the insert body.

19. The flow restriction device of claim 14, wherein the housing comprises a window extending through an outer surface of the housing, between the first and second end portions of the housing, and wherein any of the third opening and the fourth opening of the fluid passage is aligned with the window, such that the fluid passage is visible through the window.

20. The flow restriction device of claim 19, wherein the insert body comprises a wall having a height that extends in a direction away from an outer surface of the housing, and a length that extends around any of the third opening and the fourth opening through the outer surface.

* * * * *